Sept. 17, 1963   R. P. HARBAGE ET AL   3,103,777
BELT DRIVEN RAKE

Filed Aug. 28, 1961   3 Sheets-Sheet 1

INVENTORS.
ROBERT P. HARBAGE.
LEE E. VAUGHAN.
RICHARD E. CROWN.
BY
ATTORNEYS.

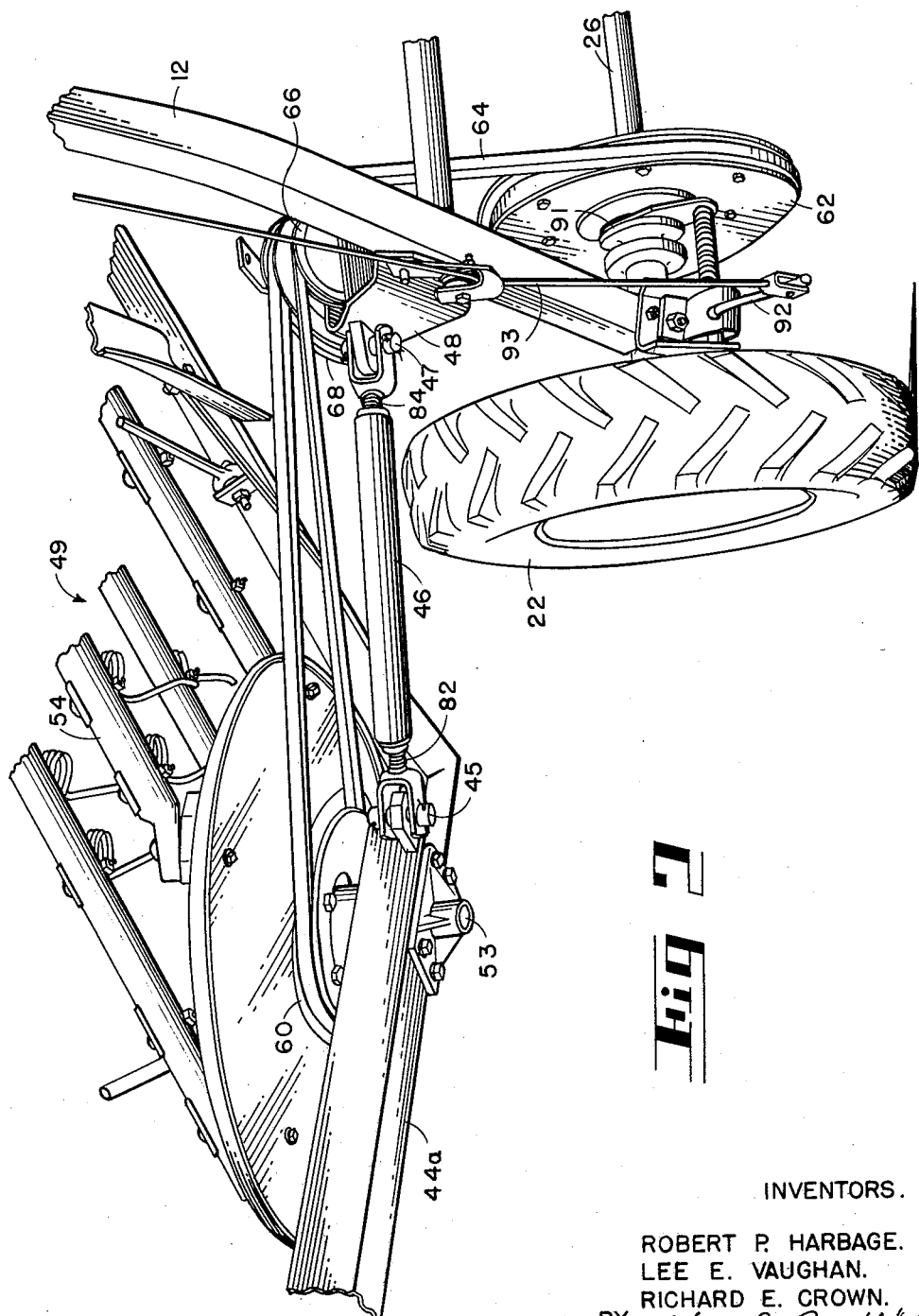

Sept. 17, 1963    R. P. HARBAGE ET AL    3,103,777
BELT DRIVEN RAKE
Filed Aug. 28, 1961    3 Sheets-Sheet 3
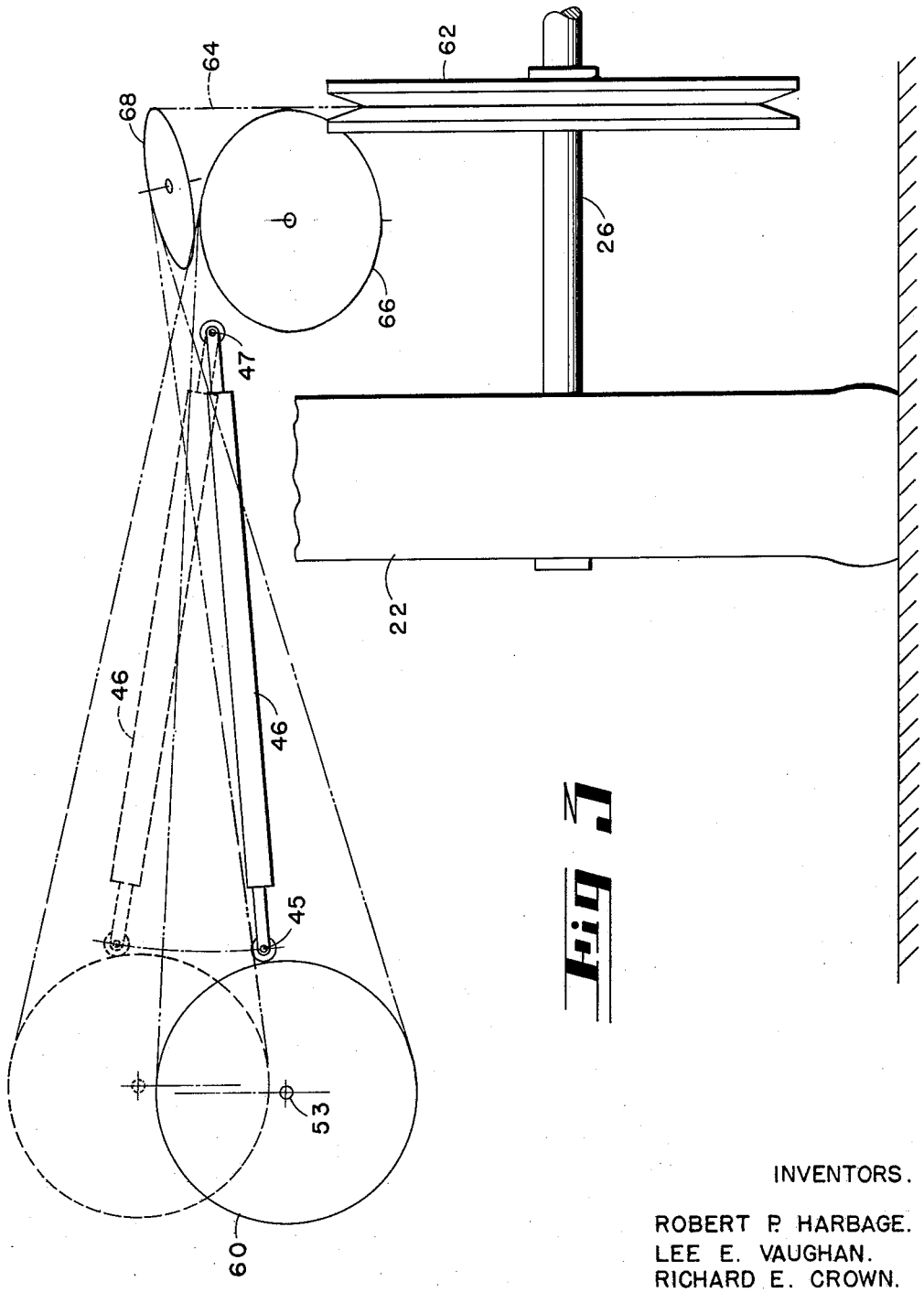
INVENTORS.
ROBERT P. HARBAGE.
LEE E. VAUGHAN.
RICHARD E. CROWN.
BY
ATTORNEYS.

United States Patent Office 3,103,777
Patented Sept. 17, 1963

3,103,777
BELT DRIVEN RAKE
Robert P. Harbage, Greenville, and Lee E. Vaughan and Richard E. Crown, Celina, Ohio, assignors to Avco Corporation, Coldwater, Ohio, a corporation of Delaware
Filed Aug. 28, 1961, Ser. No. 134,392
5 Claims. (Cl. 56—377)

This invention relates to a belt drive and basket-stabilizing device for a side delivery rake.

It is a primary object of the invention to combine a belt drive mechanism for a side delivery rake with a stabilizer bar for the subframe of the rake to assure satisfactory operation of the belt drive assembly while affording economy of structure possible in the belt drive as compared to more cumbersome and expensive gear boxes and other transmission means.

It is a further object to provide a drive for a rake reel having smoother operation than is possible by certain other drives, such as universal joint connections and other mechanisms.

It is a further object to assure a variation in the belt tension between operative position and inactive transport positions so that the tension on the belt is adequate for operation but reduced when the rake is transported.

The above and other objects of the invention will appear more fully from the following more detailed description and by reference to the accompanying drawings forming a part hereof and wherein:

FIG. 2 is an enlarged view showing more in detail the belt drive assembly with a stabilizer bar in position and showing its relation to the belt drive.

FIG. 3 is an enlarged diagrammatic showing of the belt and stabilizer together with the position of the sheaves showing the arrangement of the parts such that the belt is tightened by the linkage, including the stabilizer bar, in downward operating position of the rake and loosened when the rake is raised for transport or storage.

Figure 1:
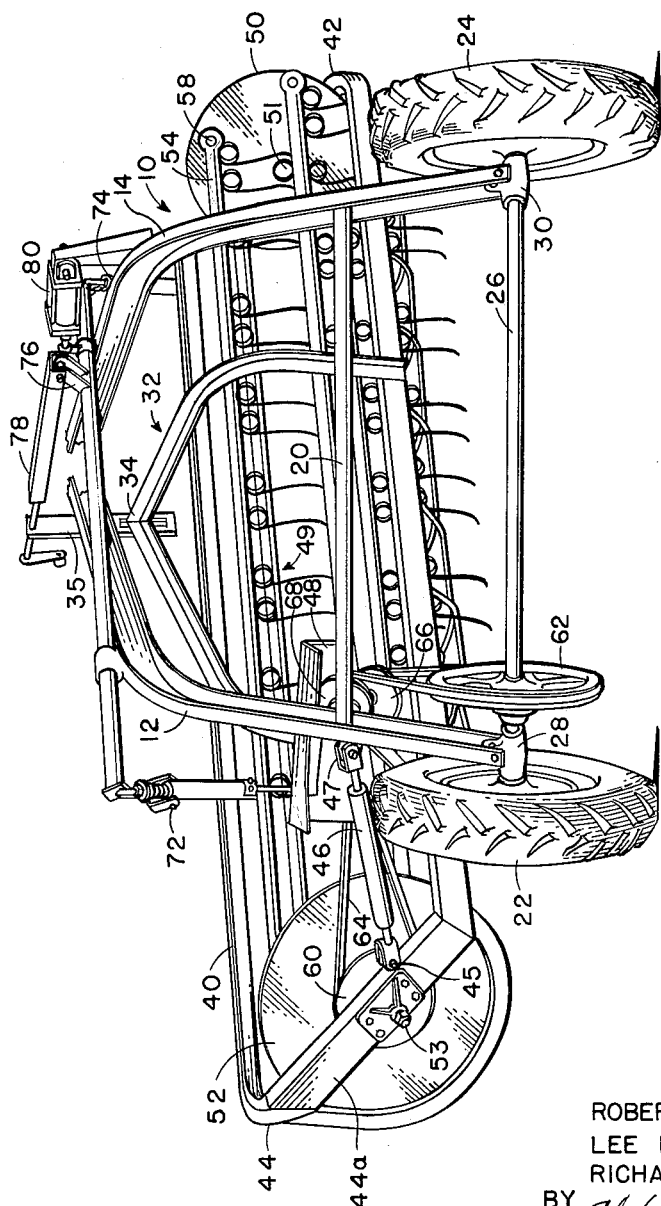
FIG. 1 is a rear view of a side delivery rake employing a mechanism of the invention.

Referring to the drawings, the rake shown comprises an arched main frame 10 which when viewed in plan view is substantially V shaped. The frame 10 has a pair of rearwardly extending legs 12, 14, both legs being substantially the same length. At the forward end of the frame 10, or the apex of the V, a hitch or clevis member is provided, whereby the frame may be coupled to the drawbar of a tractor or the like so the rake may be drawn over a field for raking operation. The legs 12, 14 are interconnected by a cross bar 20 to give rigidity to the main frame structure.

The frame 10 is supported at its rear end by a pair of ground wheels 22, 24 spaced transversely to the line of draft. Such wheels are rotatable about a common axis and spaced outwardly of each frame leg. Each wheel is connected to a common axle 26 with bearing blocks 28, 30 connecting the axle 26 to the rearward end of each frame leg 12, 14. Thus, it is evident that the main frame 10 is supported at three points; namely, the forward hitch or clevis member which supports the forward end of the rake and wheels 22, 24 which support the rear end of the rake.

Mounted on the main frame 10 and suspended thereneath is a subframe 32 which, like the main frame 10, is generally V shaped in plan form. The apex of the V faces forwardly and is pivotally connected through a mounting 34 to a vertical bracket 35 secured to the left leg 12 of the main frame 10.

Carried on the subframe 32 is a rake basket 40 which extends diagonally relative to the line of draft of the rake. The rake basket has a forward end 42 and a rear trailing end 44. The leading and trailing ends of the rake basket project laterally of the frame structure of the rake. The rake basket 40 is an integral part of the subframe 32 and with the subframe 32 is held in proper position transversely of the main frame 10 by a compression stabilizer bar 46 which is also a belt tightener, as will later appear. This compression stabilizer extends from a pivot point 45 on the rearward end of the basket to a point 47 on the belt idler bracket 48 and the belt idler bracket 48 is connected to the left main frame leg 12 but is forward of the rear end of the left frame leg 12. Rotatable in the basket is a raking reel 49 comprising a pair of reel heads 50, 52 about laterally-spaced fore and aft extending axes 51, 53. Reel head 50 is rotatable on the shaft 51 in the forward end of the rake basket. Extending between the reel heads are five rake bars 54, each which carries a series of rake tines. The end of each bar is connected to each adjacent reel head and supported thereon by a bearing structure comprising a bearing housing 58 attached to the reel head. A stud extending from each bearing housing is attached to the end of the rake bar. There are five bearings in each reel head 50, 52, there being ten bearings in all supporting the ends of the rake bars 54 for rotation with the reel heads.

Adjacent to the rear reel head 52 is a V sheave 60. The V sheave 60 is attached to the reel head 52 and rotates therewith.

In order to accomplish the raking action the rake bars 54, carried by the reel heads 50 and 52, are rotated as a unit on the bearings 51, 53. The means for accomplishing this rotation is a belt drive from the ground wheel axle 26 to the V sheave 60 accomplished by a drive sheave 62 on axle 26 which carries a belt 64 in a substantially right angle turn around intermediate idler sheaves 66, 68 carried on the bracket 48 supported on the main frame leg 12, thus completing the belt drive connection between the drive sheave 62 to the V sheave 60 on the reel head 52. The stabilizer bar 46 serves the dual purpose of a belt tightener and stabilizer bar to maintain the rake basket 40 with its rotating rake bars in proper lateral position relative to the main frame 10. It is understood that the subframe 32 carries the rake basket 40 and this frame is supported by vertical links 72, 74 and is supported forwardly in the previously-mentioned pivotal connection 34. The vertical movement of the rake basket for both adjustment and major vertical movement for transport from its downward operating position is effected by a bell crank and lever unit 76 actuated by a crank 78 or by an hydraulic cylinder 80 if desired (FIG. 1).

The stabilizer bar 46 is, as shown in FIG. 2, provided with threaded end portions 82, 84, which include clevis connections for effecting connection of the ends of the stabilizer bar to the pivot 47 which is supported on the bracket 48 and the pivot 45 which is supported on end cross bar 44a on its basket 40 adjacent the bearing 53.

The length of the stabilizer bar can thus be adjusted for varying tension on the belt 64. The pivot 45 is, however, positioned relative to the bearing 53 in such position, as shown in FIG. 3, that the longitudinal axis of stabilizer bar 46, shown in full lines in FIG. 3, is positioned with closer alignment of the pivots 45, 47 and the bearing 53 in the down position of the stabilizer bar 46 and rake basket 40 (FIG. 1) than is the case when the rake basket 40 and stabilizer bar 46 are in upper position, as shown by the dotted lines for bar 46 in FIG. 3. It is understood that the up and down position of the rake basket is effected by the hydraulic cylinder 80 or the manual crank 78 which actuates the vertical links 72, 74 to raise the rake basket 40 or to allow it to drop by gravity to its operating downward raking position. It is thus evident on inspection of FIG. 3 that the solid line down position of the linkage, comprising stabilizer bar 46, which corresponds with the down position of the rake basket affords a greater distance between the idler sheaves 66, 68 and the bearing 53 which is axis of V sheave 60 than is the case when the stabilizer bar linkage 46 (which follows movement of rake basket 40, FIG. 1) are in their up position, as shown by dotted lines in FIG. 3. That is, the shorter distance afforded between the axis of the V sheave 60 (bearing 53) and the idler sheaves 66, 68 will result in a loosening of the belt in the upper transport position and will cause the belt to be tightened in its lower operating position represented by the solid line in FIG. 3.

As shown in FIG. 3 in full lines indicating the down or operating position, the locations of the pivots 45 and 47 relative to the axis of rotation of the bearing 53 are such that in such down operating position the pivots 45, 47, determining longitudinal axis position of the stabilizer bar 46, provides substantial alignment of the axis of the stabilizer bar with the rotating axis of the driven sheave 60, and further that this axis of the stabilizer bar thus positioned when extended passes between the idler sheaves 66, 68. Thus the stabilizer bar 46 acts as a satisfactory tension member for the belt 64 as the bar 46 is in substantial alignment and extends between the two axes of rotation of the belt sheaves to be tightened. Further, the movement of the subframe and reel carrying the sheave 60 and the pivot 45 as well as the bearing 53 upward to the dotted line position of FIG. 3 will, because of the pivoting on the axis 47 which is fixed on the main frame, cause the misalignment of the axes 53, 45, 47 to the position shown in dotted lines in FIG. 3. Such movement will cause the distance between the axis 53 and the rotating axes of the idler sheaves 66, 68 to be reduced and thus result in a slackening of the belt on upward movement as is clearly shown in FIG. 3 by the two positions of axes 53. It is to be noted also that if the construction be modified so that the axes 53, 45, 47 are not in exact alignment in the down position, the same general effect can be accomplished by provision of location of the axes such that the axes 53, 45, 47 are in closer alignment in the down position than in the up position, as such result will accomplish a greater belt tension in the down position.

As shown in FIG. 2, the drive sheave 62 on the axle 26 is rotatably connected to that axle by a clutch 91 actuated by a lever 92 which is in turn actuated, if desired, by a cable 93 which may extend to a remote position for actuation by an operator who may be seated on the tractor which draws the rake. It is thus possible to put the wheel drive for the belt connection 64 into or out of operation at the will of the operator and also to lift the rake basket 40 and its reel 49 into transport position or into downward operating position if desired.

It is apparent that the member 46 serves two purposes, namely, that of a stabilizer bar and a belt tensioning member positioning the sheave 60 relative to the drive sheave 62 and the intermediate guide sheaves 66 and 68 so that the mechanism may be operated in a satisfactory manner by the belt drive, and further, this member 46 by its relative positioning and the positioning of its pivots 45 and 47 relative to the other parts of the mechanism, such as bearing 53, as above described, enables the belt to be put into a tightened preadjusted position for operation, while on upward movement of the rake basket 40 in the transport position will loosen the belt and leave it in a position for storage or transport and again put it in tensioned operating position when the subframe is again lowered.

Although the invention has been described by reference to a specific structure found practical in actual operation, it is nevertheless intended that various modifications may be made therein without departing from the fundamental principles herein disclosed and within the scope of the following claims.

We claim:

1. In a side delivery rake structure, a main frame, a pair of wheels supporting said frame at the rear thereof, a subframe carried by said main frame, a rake wheel supported in said subframe, a driven sheave connected to said rake reel for rotation thereof, a drive sheave connected for rotation by at least one of said pair of wheels, intermediate idler sheaves between said drive and driven sheaves mounted on said main frame, a belt means positioned in drive association around said drive sheave, said idler sheaves and said driven sheave, means to raise said rake reel to non-drive position and to lower said rake reel to drive position, an adjustable stabilizer bar having pivot connections at one end to said main frame and at the other end to said subframe adjacent the axis of said rake reel, said stabilizer bar permitting adjustment of predetermined amounts of tension on said belt means, the axis of said stabilizer bar being in substantial alignment with the axis of rotation of said driven sheave when said rake reel is in said downward position, and in substantial non-alignment with said axis of rotation when said rake reel is in the upper transport position, whereby said belt means drives said driven sheave in said downward position, but does not drive said driven sheave in said upper transport position.

2. In a side delivery rake structure, a main frame, a pair of supporting wheels on said main frame, a subframe in association with said main frame having a rake reel rotatably supported therein, drive means for said rake reel, said drive means comprising a drive sheave connected for rotation by at least one of said wheels, a driven sheave connected for rotation with said rake reel, intermediate idler sheaves between said drive sheave and said driven sheave, a belt means in drive association with said drive sheave, said idler sheaves and said driven sheave, an adjustable stabilizer bar having pivot connections disposed at each end thereof and between said main frame and said subframe, means to optionally position said subframe and rake reel in downward operating position and upper transport position, said pivot connections being in closer alignment with said axis of rotation in said downward position of said rake reel than in the upper position thereof, said adjustable stabilizer bar providing means for adjusting said belt means with predetermined tension in said downward position, whereby said belt means does not drive said driven sheave and said rake reel in said upper position but does drive said driven sheave and said rake reel in said downward operating position.

3. The invention as defined in claim 1 wherein said pivot connections for said stabilizer bar are in closer alignment with the axis of rotation of said driven sheave in said downward position than in said upper transport position of said subframe and said rake reel, thereby affording greater distance between said idler sheaves and said driven sheave in said downward operating position whereby greater tension is exerted on said belt means in said downward position.

4. The invention as defined in claim 2 wherein the geometrical relative location of said stabilizer bar with respect to said intermediate sheaves and said driven sheave is such that the arcuate swing thereof provides a maximum distance between said idler sheaves and said driven sheave in said downward operating position, whereby in said last named position said belt means is under maximum and operative tension and in said upper position the tension on said belt means is released and said belt means is rendered inoperative.

5. The invention as defined in claim 4 wherein said stabilizer bar is positioned to extend in a generally horizontal direction from said main frame to said subframe thereby controlling the sidewise positioning of said subframe relative to said main frame.

References Cited in the file of this patent

UNITED STATES PATENTS

| | | |
|---|---|---|
| 2,505,704 | Bowman | Apr. 25, 1950 |
| 2,519,005 | Thompson et al. | Aug. 15, 1950 |
| 2,657,518 | Hill et al. | Nov. 3, 1953 |
| 3,003,299 | Smith et al. | Oct. 10, 1961 |